US009805563B2

(12) United States Patent
Zhang

(10) Patent No.: US 9,805,563 B2
(45) Date of Patent: Oct. 31, 2017

(54) SECURITY DEVICE

(71) Applicant: Checkpoint Systems, Inc., Thorofare, NJ (US)

(72) Inventor: Ningsheng Zhang, Waxhaw, NC (US)

(73) Assignee: Checkpoint Systems, Inc., Thorofare, NJ (US)

( * ) Notice: Subject to any disclaimer, the term of this patent is extended or adjusted under 35 U.S.C. 154(b) by 0 days.

(21) Appl. No.: 14/958,454

(22) Filed: Dec. 3, 2015

(65) Prior Publication Data

US 2017/0162014 A1 Jun. 8, 2017

(51) Int. Cl.

*G08B 13/12* (2006.01)
*G08B 13/14* (2006.01)
*H04Q 5/22* (2006.01)
*E05B 45/06* (2006.01)
*E05B 65/00* (2006.01)
*E05B 69/00* (2006.01)

(52) U.S. Cl.

CPC ..... *G08B 13/1454* (2013.01); *G08B 13/1463* (2013.01)

(58) Field of Classification Search

CPC ........................ G08B 13/1454; G08B 13/1463
USPC .................................. 340/568.2, 542; 70/14
See application file for complete search history.

(56) References Cited

U.S. PATENT DOCUMENTS 5,722,266 A 3/1998 Yeager et al.
6,092,401 A 7/2000 Sankey et al.
7,251,966 B2 8/2007 Fawcett et al.
7,481,086 B2 1/2009 Fawcett et al.
2008/0236209 A1 10/2008 Conti et al.
2009/0223260 A1 * 9/2009 Conti .................... E05B 45/005 70/57.1
2012/0229975 A1 * 9/2012 Yang ...................... B65D 63/14 361/679.57
2014/0345336 A1 * 11/2014 Fawcett ................ E05B 45/005 70/58
2016/0307417 A1 * 10/2016 Van Landingham, Jr. ................ E05B 73/0029

* cited by examiner

*Primary Examiner* — Jack K Wang
(74) *Attorney, Agent, or Firm* — McNair Law Firm, P.A.

(57) ABSTRACT

A security device includes: a housing having a plug receptacle; a spool rotatably coupled to the housing; a locking mechanism having a locked state and an unlocked state, the locked state preventing the spool from rotating in a first direction, and the unlocked state allowing rotation of the spool in the first direction and in a second direction; a plug having an inserted position and a removed position with respect to the plug receptacle, the inserted position maintaining the locking mechanism in the locked state, and the removed position allowing alteration of the locking mechanism from the locked state to the unlocked state; a cable coupled to the spool and to the plug; an alarm circuit which activates an alarm upon sensing discontinuity of the cable and/or the plug moving from the inserted position to the removed position, the alarm circuit coupled to and rotating with the spool.

15 Claims, 12 Drawing Sheets

SECURITY DEVICE

FIELD OF THE INVENTION

The field of the present invention relates to security devices used to protect merchandise or other objects and, more particularly, to security devices having one or more adjustable cables used to wrap around the objects such that the security devices are secured to the objects.

BACKGROUND OF THE INVENTION

Electronic article surveillance (EAS) systems are often used to deter and detect shoplifting. Typically, an EAS security system includes an EAS tag, a transmitter, a receiver, and an alarm. The EAS tag is attached to a piece of merchandise. The transmitter and the receiver are positioned at the exit of a retail establishment and configured to establish a detection zone in which a consumer must pass through as he or she exits the retail establishment. The transmitter is configured to send signals through the detection zone. When an EAS tag enters the detection zone, the EAS tag responds and creates a signal or a change or disturbance in the original signal transmitted by the transmitter, which is detectable by the receiver. Upon detection of the EAS tag, the alarm is triggered in order to notify the store personnel that someone is trying to exit the retail establishment with merchandise that has an attached and active EAS tag.

In an EAS system, it is the actual EAS tag that is being detected and not the merchandise itself. Therefore, an EAS system can be circumvented by removing the EAS tag from the merchandise. To prevent the unauthorized removal of the EAS tag, security devices have been developed. A typical security device is configured to house the EAS tag and attach the EAS tag to the merchandise in a manner that limits the likelihood that a consumer or a would-be thief could tamper with or otherwise remove the EAS tag from the merchandise.

As an example, one particular type of security device is a cable wrap security device such as the one disclosed in U.S. Pat. No. 7,497,101, which is incorporated herein by reference in its entirety. Typically, a cable wrap security device includes a first housing for a ratchet mechanism, a second housing for an EAS tag, and a cable that is routed through both the first and second housings and configured to wrap around the package of the merchandise. The ratchet mechanism is configured to tighten the cable around the package such that the security device is not removable from the package without being loosened. The security device further includes a locking mechanism that prevents loosening or release of the cable without a specifically configured key or other specialized equipment that is controlled by the employees of the retail establishment. In some applications, the cable of the cable wrap security device also prevents a consumer or would-be thief from opening or otherwise tampering with the package to get to the merchandise within the package.

While this type of security device has proven effective at protecting merchandise, it has been found that additional security features are desirable in order to further improve the effectiveness of such security devices.

SUMMARY OF THE INVENTION

Embodiments of the present invention are directed to a security device which is securable to an object, such as merchandise. The security device includes features which prevent unauthorized removal of the security device from the object and/or tampering with the security device.

In a first separate aspect of the present invention, a security device includes: a housing having a plug receptacle; a spool rotatably coupled to the housing and rotatable in both a first direction and a second direction with respect to the housing; a locking mechanism alterable between a locked state and an unlocked state, wherein the locking mechanism in the locked state prevents the spool from rotating in the first direction, and the locking mechanism in the unlocked state permits the spool to rotate in the first direction and in the second direction; a plug having an inserted position and a removed position with respect to the plug receptacle, wherein in the inserted position, the plug maintains the locking mechanism in the locked state so that the spool is rotatable in the second direction with respect to the plug, and in the removed position, the locking mechanism is alterable from the locked state to the unlocked state; a cable having a first end coupled to the spool and a second end coupled to the plug; and an alarm circuit configured to activate an alarm upon sensing at least one of discontinuity of the cable and movement of the plug from the inserted position to the removed position.

In a second separate aspect of the present invention, a security device includes: a housing having a plug receptacle; a plug having an inserted position and a removed position with respect to the plug receptacle; a spool rotatably coupled to the housing and rotatable in both a first direction and a second direction with respect to both the housing and the plug; a cable having a first end coupled to the spool and a second end coupled to the plug; a locking ring coupled to the spool to rotate with respect to the housing and with respect to the plug, the locking ring being moveable between a locked position and an unlocked position, wherein the locking ring in the locked position engages the housing to prevent the spool from rotating in the first direction, and with the locking ring in the unlocked position, the spool is rotatable in the first direction and in the second direction; and an alarm circuit coupled to the spool to rotate with respect to the housing and with respect to the plug when the plug is in the inserted position, the alarm circuit including a resilient contact member, which is alterable between a first state with the plug in the removed position and a second state with the plug in the inserted position, and a wireless receiver, which is configured to receive an alarm disable signal, wherein the alarm circuit is configured to activate an alarm upon sensing movement of the plug from the inserted position to the removed position without first receiving the alarm disable signal.

In a third separate aspect of the present invention, a security device includes: a housing having a plug receptacle; a spool rotatably coupled to the housing and rotatable in both a first direction and a second direction with respect to the housing; a locking mechanism coupled to the housing and alterable between a locked state and an unlocked state, wherein the locking mechanism in the locked state prevents the spool from rotating in the first direction, and with the locking mechanism in the unlocked state, the spool is rotatable in the first direction and in the second direction; a plug having an inserted position and a removed position with respect to the plug receptacle, wherein in the inserted position, the plug maintains the locking mechanism in the locked state so that the spool is rotatable in the second direction with respect to the plug, and in the removed position, the locking mechanism is alterable from the locked state to the unlocked state; a cable having a first end coupled to the spool and a second end coupled to the plug; and an alarm circuit coupled to the spool to rotate with respect to the housing and with respect to the plug when the plug is in the inserted position, the alarm circuit including: a first sensing circuit configured to sense discontinuity of the cable; a second sensing circuit having a resilient contact member movable between a first state in which the second sensing circuit is open and a second state in which the second sensing circuit is closed, wherein the contact member is in the second state when the plug is in the inserted position, and the contact member moves to the first state when the plug is moved from the inserted position to the removed position, wherein the alarm circuit is configured to activate an alarm upon sensing at least one of discontinuity of the cable and movement of the contact member from the first state to the second state.

Accordingly, an improved security device is disclosed. Advantages of the improvements will be apparent from the drawings and the description herein.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION OF THE INVENTION

Figure 1:
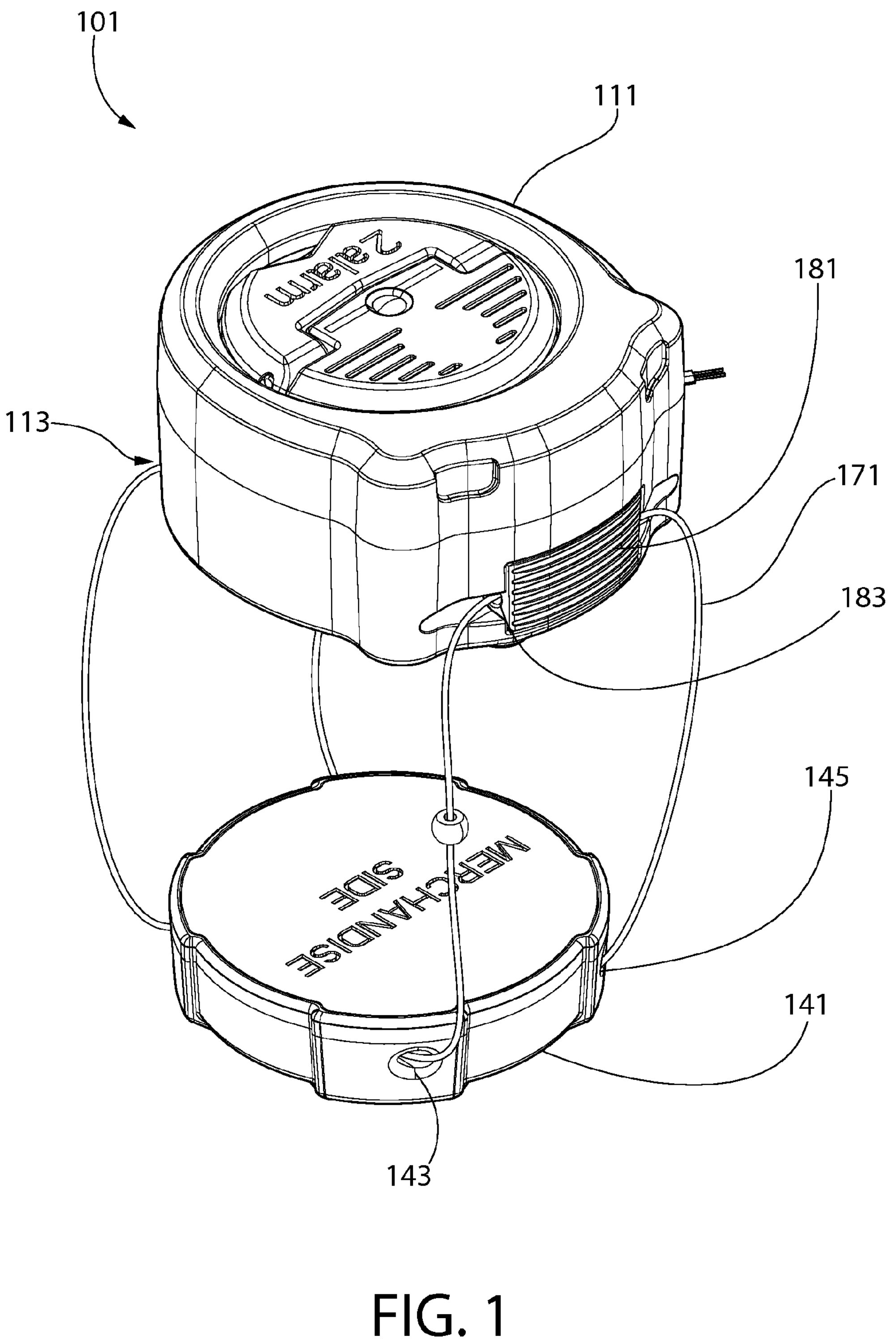
FIG. 1 is a perspective view of a first embodiment of a security device.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as “lower,” “upper,” “horizontal,” “vertical,” “above,” “below,” “up,” “down,” “left,” “right,” “top” and “bottom” as well as derivatives thereof (e.g., “horizontally,” “downwardly,” “upwardly,” etc.) should be construed to refer to the orientation as then described or as shown in the drawing under discussion. These relative terms are for convenience of description only and do not require that the apparatus be constructed or operated in a particular orientation unless explicitly indicated as such. Terms such as “attached,” “affixed,” “connected,” “coupled,” “interconnected,” and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

The present invention is directed toward a security device which may be secured to an object, such as an article of merchandise, to prevent unauthorized removal, access to, or tampering with the object. The security device is includes a cable which enables the security device to be secured to the object, by wrapping the cable around the object, in such a way so as to prevent removal of the security device from the object and to prevent unwanted access to the object. The security device may include one or more alarm features, with each alarm feature set to activate an alarm in response to one or more predefined conditions, which may include removal of the security device from the object, damage caused to the security device, and/or removal of the object from a predefined locality (such as through the use of an EAS system).

The security device may include multiple features to help make removal of the security device from the object difficult without use of specified tools, which are intended to facilitate removal of the security device from the object. Several of such features are described below, with the extent of such features incorporated into the security device, and the configuration of such features, being limited only by the scope of the claims below. Where those features are known from the prior art, such as in U.S. Pat. No. 8,087,269, the known features are only briefly described without being described in detail.

Turning in detail to the drawings, FIG. 1 shows a security device 101 which includes a first housing 111 and a second housing 141, a cable 171, and a plug 181. The cable 171 depicted is a single cable which attaches to a first point 113 on or within the first housing 111, passes through a first cable opening 143 in the second housing 141, through a cable opening 183 in the plug 181, through a second cable opening 145 in the second housing 141, to attach to a spool (see FIG. 4A) within the first housing 111. Coupled in this manner, and with the plug 181 coupled to the first housing 111 as shown, the cable 171 may be wrapped around an object securely by tightening the wrapped cable around the object. The security device 101 is configured such that only by loosening the cable with the prescribed tool may the cable be unwrapped from the object without the security device 101 activating an alarm.

In certain embodiments, the cable 171 may attached at one end to the first housing 111 and at a second end to the plug 181, such that when the plug 181 is coupled to the first housing 111, the cable 171 forms a single loop.

Figure 2A:
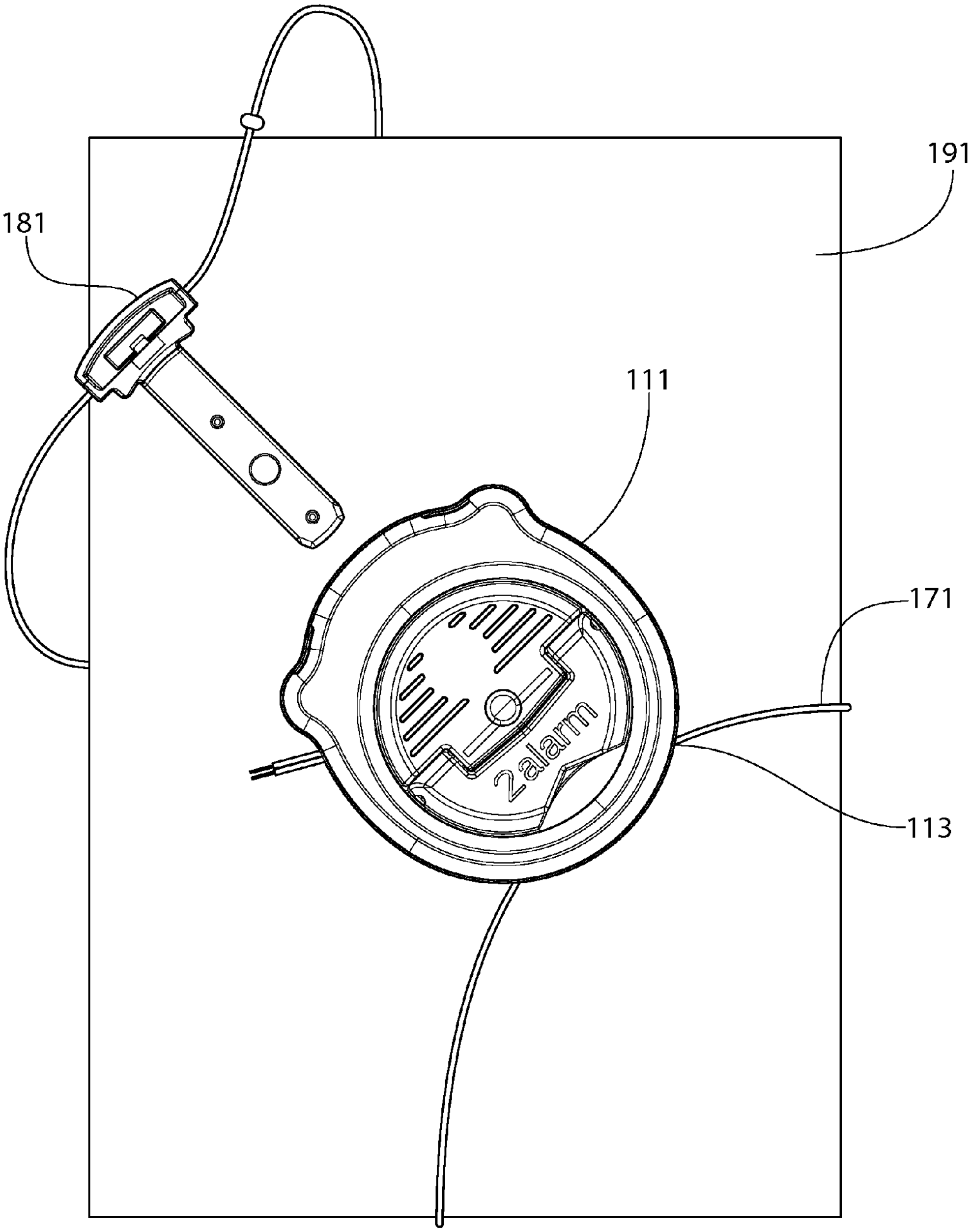
FIG. 2A is a top view of an object with the security device of FIG. 1 positioned to be wrapped around the object.
Figure 2B:
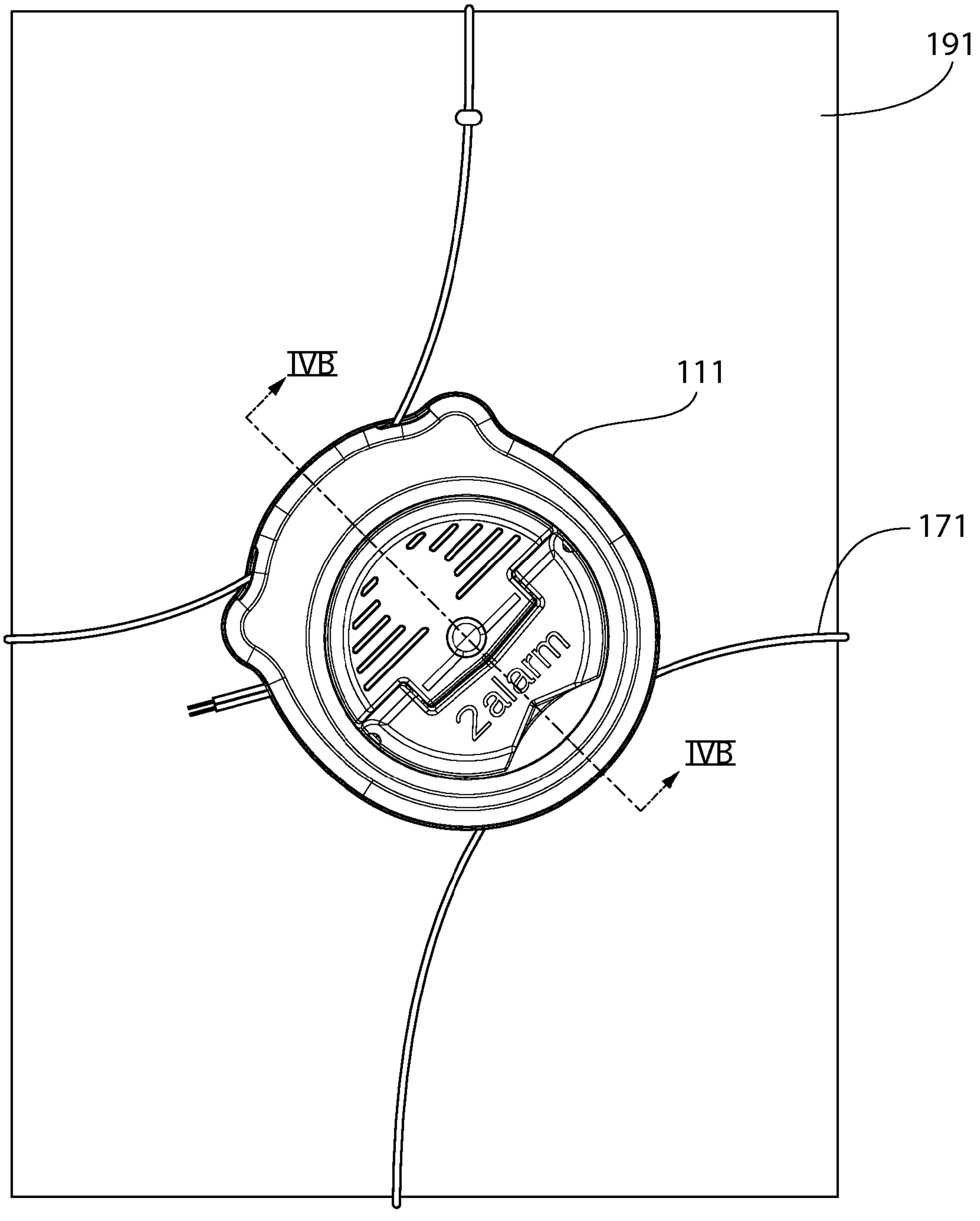
FIG. 2B is a top view of the object with the security device of FIG. 1 wrapped around the object.
Figure 2C:
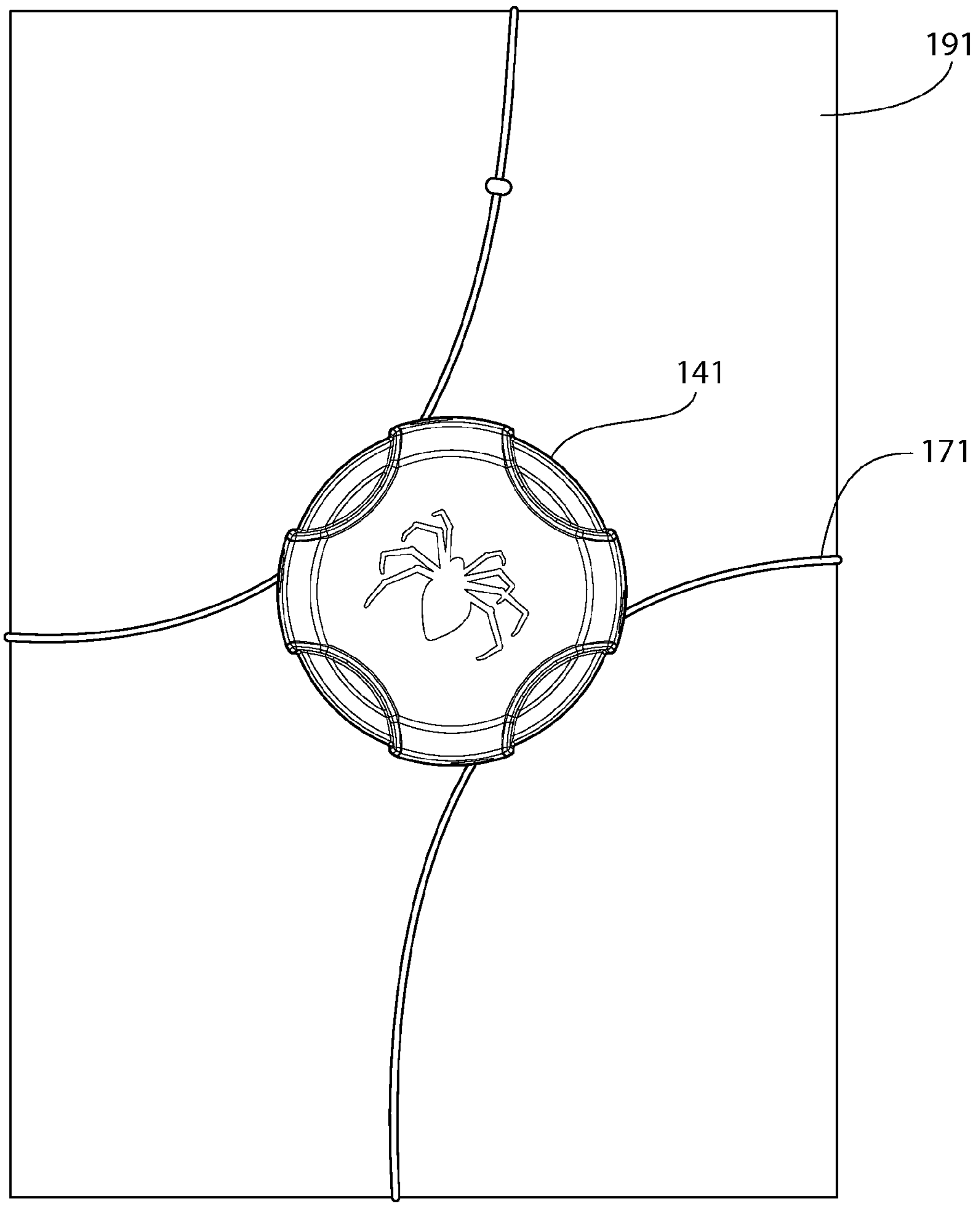
FIG. 2C is a bottom view of the object with the security device of FIG. 1 wrapped the object.

In FIG. 1, the plug 181 is shown in an inserted position (see FIG. 2B) within a plug receptacle 117 of the first housing 111. As is described in greater detail below, the plug 181 may be removed from the plug receptacle 117, and thus from the first housing 111, to a removed position (see FIG. 2A) in which the plug 181 is coupled to the first housing 111 only by the cable 171. With the plug 181 in the removed position, as shown in FIG. 2A, the cable 171 may be wrapped around an object 191, with the first housing 111 on one side of the object 191 and the second housing (see FIG. 2B) on the other side of the object 191. The plug 181 may then be positioned for insertion into the plug receptacle 117 of the first housing 111. When the plug 181 is inserted into and secured within the plug receptacle 117 of the first housing 111, the cable 171 wrapped around the object 191 may be tightened around the object 191 to securely couple the security device 101 to the object. When the security device 101 is secured to the object 191, the first housing 111 is positioned on one side of the object 191 as shown in FIG. 2B, and the second housing 141 is positioned on an opposite side of the object 191 as shown in FIG. 2C. In certain embodiments, depending upon the length of the cable 191 between the first housing 111 and the second housing 141, the length of the cable 191 between the second housing 141 and the plug 181, and the size and shape of the object, the first housing 111 and the second housing 141 may not be on an opposite sides of the object 191.

Those skilled in the art of merchandise security will appreciate that, in addition to securing the security device 101 to the object 191, the cable 171 wrapped around the object 191 may also inhibit or prevent tampering with or accessing the contents of the object. The security device 101 includes mechanisms which aid in preventing the security device 101 from being removed from the object 191. Such mechanisms are discussed in detail in connection with FIGS. 3-4B As one security feature of the security device 101, the second housing 141 may include an EAS tag 147 (see FIG. 3). More specifically, an EAS tag 147 may be enclosed within an interior space formed within second housing 141. The EAS tag 147 may be sealed within the second housing 141 to make the EAS tag 147 inaccessible to consumers and would-be thieves.

In the embodiment shown, the first housing 111 contains a rotatable spool configured to loosen and tighten the cable 171, and the second housing 141 contains the EAS tag 147. In certain embodiments, the second housing 141 may be omitted, such that the EAS tag 147 may be omitted from the security device 101, or alternatively, the EAS tag 147 may be incorporated into the first housing 111.

Figure 3:
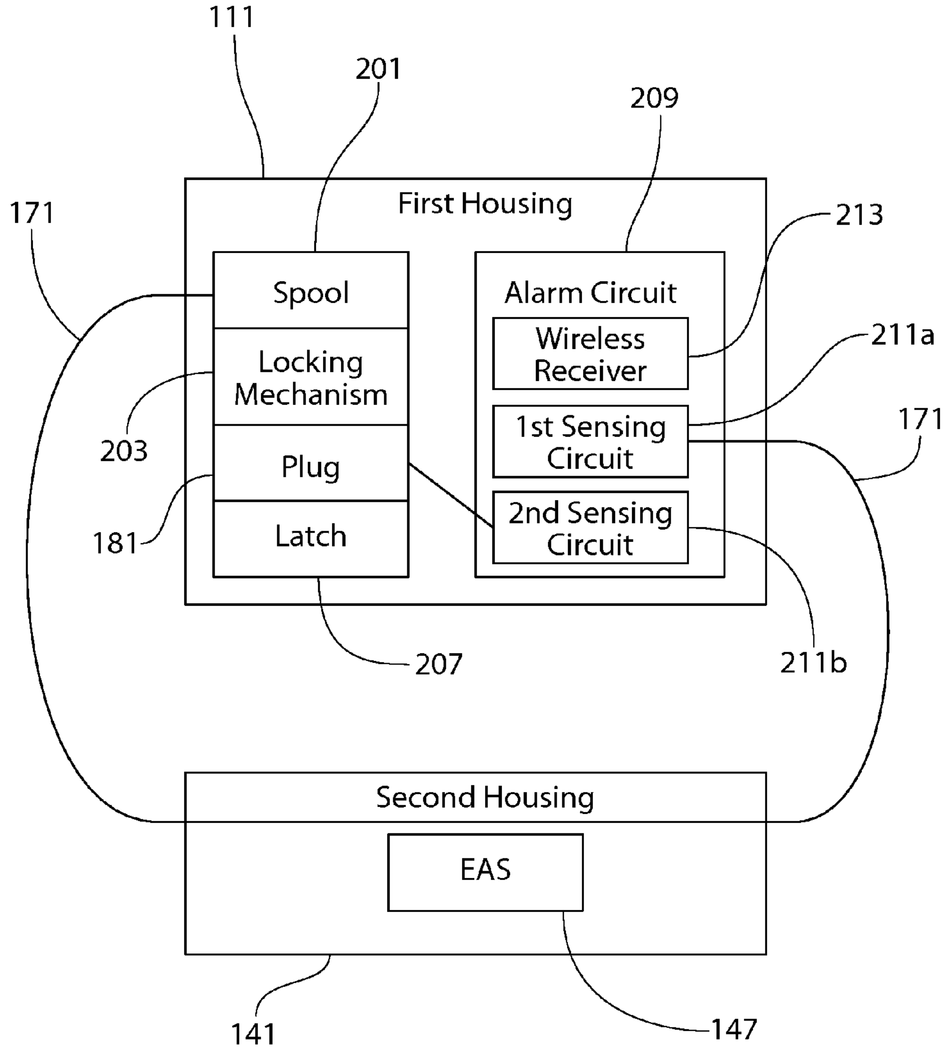
FIG. 3 is schematic representation of the security features of the security device of FIG. 1.

The security features of the security device 101 are shown schematically in FIG. 3. Within the first housing 111, the security device 101 includes a spool 201, which is rotatable with respect to the first housing 111, and a locking mechanism 203 which interacts with the spool 201. The state of the locking mechanism 203 determines whether the spool 201 is rotatable in one or two directions. The locking mechanism 203 is alterable between a locked state and an unlocked state. When the locking mechanism 203 is in the locked state, the spool 201 is only able to rotate in a first direction about a rotational axis, and when the locking mechanism 203 is in the unlocked state, the spool 201 is rotatable in the first direction and in the second direction about the rotational axis. As indicated above, within the first housing 111, the security device 101 also includes a plug 181, and the plug 181 interacts with the locking mechanism when the plug 181 is in the inserted position within the plug receptacle of the first housing 111. With the plug 181 in the inserted position, the locking mechanism 203 is in the locked state and is prevented from altering to the unlocked state. When the plug 181 is removed from the plug receptacle of the first housing 111, i.e., moved from the inserted position to the removed position, the locking mechanism 203 may be altered from the locked state to the unlocked state. The security device 101 may also include, within the first housing 111, a latch 207 which interacts with the plug 181. When the plug 181 is inserted into the plug receptacle 117 of the first housing 111, the latch 207 moves into an engaged position, in which it engages the plug 181 to maintain the plug 181 in the inserted position. The latch 207 is moveable from the engaged position into to a disengaged position, in which the latch 207 disengages the plug 181. The latch 207 may be moved from the engaged position into to the disengaged position through the use of a magnet or an electronic signal.

An alarm circuit 209 is also included within the first housing 111 of the security device 101. The alarm circuit 209 is configured to monitor the continuity of the cable 171 and the inserted position of the plug 181. The alarm circuit 209 may also be configured to monitor the state of other security features of the security device 101, such as the state of the locking mechanism 203, the state of the latch 207, and the like. As shown, the alarm circuit 209 includes a first sensing circuit 211*a* and a second sensing circuit 211*b* to accomplish each of these monitoring tasks, with the first sensing circuit 211*a* sensing the continuity of the cable, and the second sensing circuit 211*b* sensing the inserted position of the plug 181. A piezo-electric device (see FIGS. 4A-4C) may be included to enable the alarm circuit 209 to sound an audible alarm when in response to any one of the sensing circuits sensing an attempt to tamper with the security device 101.

In addition, the alarm circuit 209 may include a wireless receiver 213 for receiving an alarm disable signal. When the alarm circuit 209 receives an alarm disable signal, via the wireless receiver 213, the alarm function of the alarm circuit 209 is at least temporarily deactivated. Thus, at the time of removing the security device 101 from an object 191 using an authorized/proscribed tool, an alarm disable signal may be sent to the alarm circuit 209 to disable the alarm function. In certain embodiments, the authorized/proscribed tool may be the source of the alarm disable signal. In certain other embodiments, the alarm disable signal may be generated other equipment, so that removal of the security device 101 from the object must happen in proximity to the equipment generating the alarm disable signal.

Figure 4A:
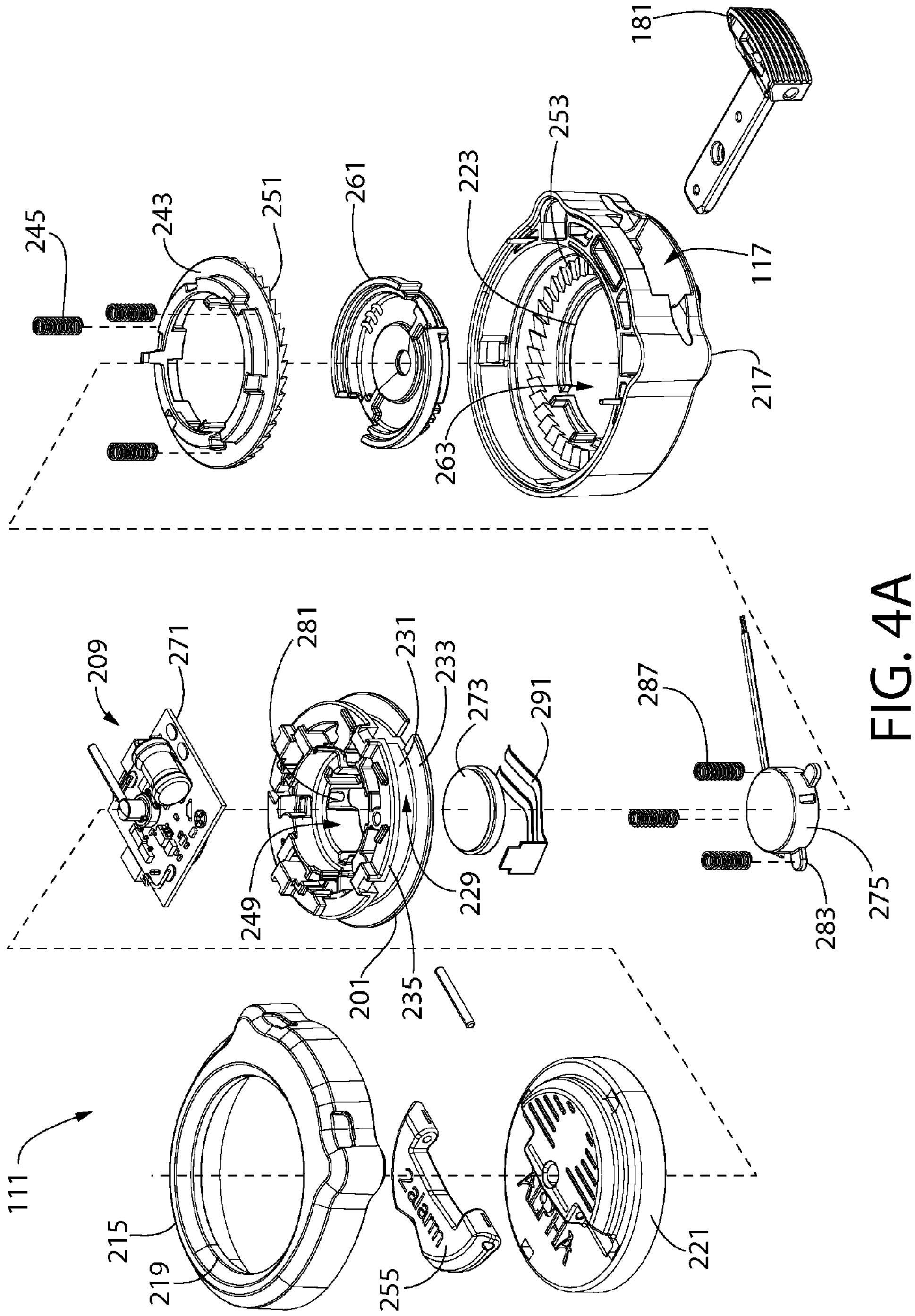
FIG. 4A is an exploded view of the security device of FIG. 1.
Figure 4B:
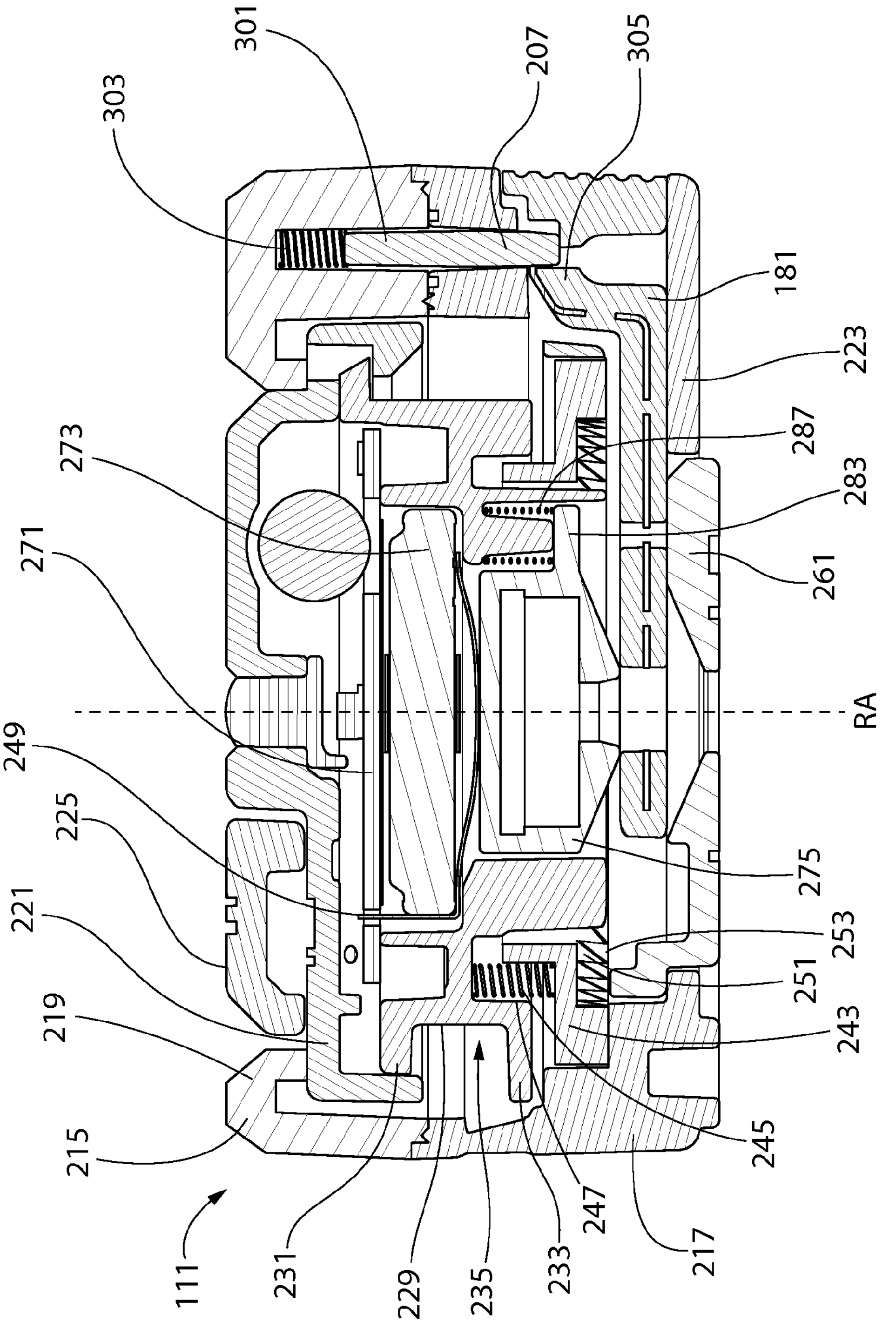
FIG. 4B is a sectional view of the first housing taken along the lines IV-IV of FIG. 2, shown with the plug in the inserted position.
Figure 4C:
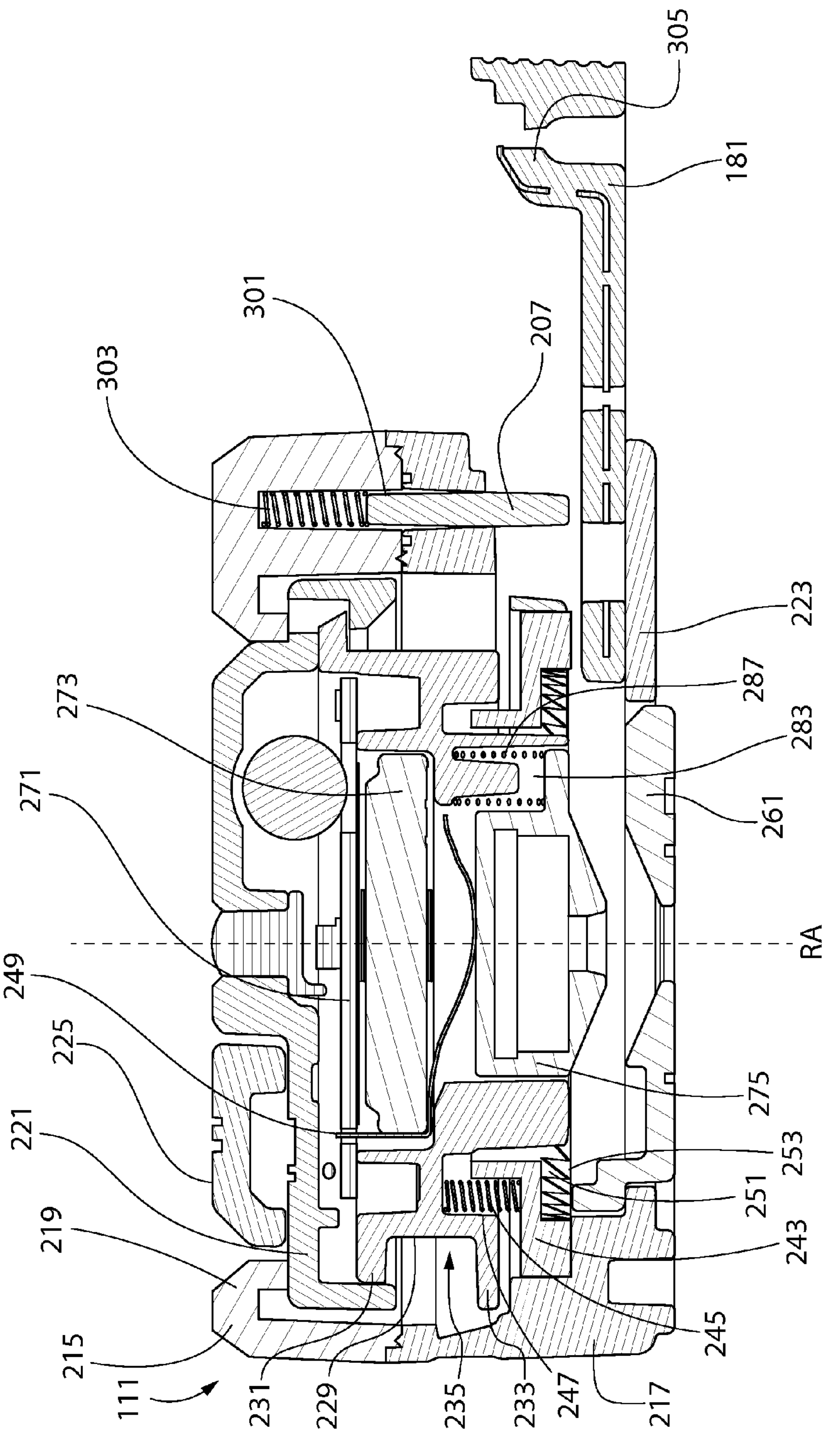
FIG. 4C is a sectional view of the first housing taken along the lines IV-IV of FIG. 2, shown with the plug in the removed position.

Referring collectively to FIGS. 4A-C, the first housing 111 is formed from a first housing part 215 connected to a second housing part 217. The two housing parts 215, 217 form an interior space to hold the spool 201 in place so that the spool 201 can rotate as described herein. The first housing part includes an annular rim 219, and a cap 221 is seated within the interior space formed by the two housing parts 215, 217 and against the rim 219. The cap 221 is coupled to and rotates with the spool 201. The second housing part 217 includes an inward extending ledge 223, and the combination of the spool 201 and the cap 221 are captive between the rim 219 and the ledge 223.

A handle 225 is pivotably coupled to the cap 221 and is accessible through the central opening of the annular rim 219 in the first housing part 215. The handle 225 may be placed in a folded position, so that it is substantially flush with the top of the first housing part 215, or it may be placed in a flipped-up position, so that it may be used to rotate the spool 201.

Within the interior space formed by the two housing parts 215, 217, the spool 201 is rotatable with respect to the first housing 111 in both a first direction and a second direction (i.e., clockwise and counter-clockwise) about a rotational axis RA. The spool 201 is captive within a cavity formed by the outer walls of the first housing 111. The spool 201 has a cylindrical side wall 229 and two cylindrical flanges 231, 233 extending outwardly from the top and bottom of the side wall 229. The side wall 229 and flanges 231, 233 form a cylindrical channel 235 in which a portion of the cable may be stored or held. One end of the cable is secured to the spool 201, and the other end of the cable is secured to the first housing 111. Rotation of the spool 201 in the second direction winds the cable around the spool 201 and rotation of the spool 201 in the first direction allows the cable to be unwound from the spool 201.

A locking ring 243 is coupled to one side of the spool 201 so that the locking ring 243 rotates with the spool 201. The locking ring 243, like the spool 201, is centered about the rotational axis RA. The locking ring 243 is also able to translate along the rotational axis RA toward and away from the spool 201. Springs 245 are held in receptacles 247 formed in the central portion 249 of the spool 201, the central portion being 249 bounded by the cylindrical side wall 229, and the springs 245 bias the locking ring 243 in a position away from the spool 201, with the extent of the translational movement being limited by the first housing 111. The surface of the locking ring 243 facing away from the spool 201 includes locking teeth 251. The surface in the first housing 111 which faces the locking teeth 251 of the locking ring 243 likewise includes complementary locking teeth 253. In combination, the locking teeth 251 of the locking ring 243 and the locking teeth 253 of the first housing 111 form a locking mechanism 203 for the security device 101. When the locking ring 243 is in a position biased away from the spool 201, the locking teeth 251 of the locking ring 243 engage the locking teeth 253 of the first housing 111, and the respective geometries of the interlocking teeth 251, 253 enables the spool 201 to rotate with a ratcheting action. Engagement between the respective locking teeth 251, 253, referred to herein as the locked state of the locking mechanism 203, prevents the spool 201 from rotating in the first direction, while still allowing the spool 201 to rotate in the second direction. When the respective locking teeth 251, 253 are not engaged, referred to herein as the unlocked state of the locking mechanism 203, the spool 201 may be freely rotated in both directions.

A button 261 is coupled to the first housing 111 and is movable in a direction parallel to the rotational axis RA. Movement of the button 261 in the direction toward the spool 201 causes the locking ring 243 to move toward the spool 201, thus placing the locking mechanism 203 in the unlocked state. Movement of the button 261 in the direction away from the spool 201 allows the locking ring 243 to move toward its biased position away from the spool 201, thus placing the locking mechanism 203 in the locked state. The first housing 111 includes an opening 263 in the annular rim 219 which gives a user access to the button 261.

The alarm circuit 209 includes a circuit board 271 which is mounted on the side of the spool 201 opposite the locking ring 243, and the circuit board 271 rotates with and is in a fixed position with respect to the spool 201. The circuit board 271 is electrically coupled to a battery 273 and to a piezo-electric device 275, which is used by the alarm circuit 209 to sound an audible alarm. The battery 273 and the piezo-electric device 275 are both positioned, at least partially, within the central portion 249 of the spool 201, and both also rotate with the spool 201. While the battery 273 is in a fixed position with respect to the spool 201, the piezo-electric device 275 is coupled to the spool 201 so that it is able to translate along the rotational axis RA toward and away from the battery 273. The spool 201 includes channels 281 which receive arms 283 extending from the body of the piezo-electric device 275. The channels 281 guide the piezo-electric device 275 as it translates along the rotational axis RA between a first position and a second position, wherein the piezo-electric device 275 in the second position is closer to the battery 273 as compared to the first position. Springs 287 are seated within the channels 281 to bias the piezo-electric device 275 into the first position.

As indicated above, the alarm circuit 209 includes at least two sensing circuits, the first for sensing continuity of the cable 171, and the second for sensing the plug 181 being moved from the inserted position to the removed position. The alarm circuit 209 includes, as part of the second sensing circuit, a resilient contact member 291, which extends from the circuit board 271 to a position between the battery 273 and the piezo-electric device 275. The resilient contact member 291 rotates with the spool 201 and includes two states. In a first state, the resilient contact member 291 is not in contact with the battery 273, thus leaving the second sensing circuit is open. In the second state, the resilient contact member 291 is in contact with the battery 273, so that the second sensing circuit is closed. When the piezo-electric device 275 is in the first position, which is further from the battery 273, the resilient contact member 291 resiliently returns to its first state. When the piezo-electric device 275 is in the second position, which is closer to the battery 273, the piezo-electric device 275 engages the resilient contact member 291 to place the resilient contact member 291 into the second state.

The plug receptacle 117 is formed so that the plug 181 may be inserted into the housing and into a position between the button 261, on the one hand, and the spool 201 and the piezo-electric device 275, on the other hand. When the plug 181 is not inserted in the plug receptacle 117, the piezo-electric device 275 is biased into the first position by the springs 287, thus also leaving the resilient contact member 291 in the first state. When the plug 181 is inserted into the plug receptacle 117, the plug 181 engages the piezo-electric device 275 to place the piezo-electric device 275 in the second position, which also places the resilient contact member 291 in the second state to close the second sensing circuit. Also, the plug 181 inserted into the plug receptacle 117 prevents the button 261 from being moved in the direction toward the spool 201, and so the locking ring 243 will be in its biased position away from the spool 201, thus placing the locking mechanism 203 in the locked state. When the plug 181 is removed from the plug receptacle 117, the button 261 may be used to move the locking ring 243 and place the locking mechanism 203 in the unlocked state.

As indicated above, the latch 207 interacts with and engages the plug 181 when the plug 181 is inserted into the plug receptacle 117. The first housing 111 includes a latch channel 301 in which the latch 207 and a coil spring 303 are disposed. The latch channel 301 is fully internal to the first housing 111. Within the latch channel 301, the latch 207 is moveable between the engaged position, in which the latch 207 extends into plug receptacle 117, and the disengaged position, in which the latch 207 is withdrawn from the plug receptacle 117. The coil spring 303 is positioned between the latch 207 and an end of the latch channel 301 to bias the latch 207 toward the engaged position. As the plug 181 is inserted into the plug receptacle 117, the plug 181 engages the latch 207 to first push the latch 207 toward the disengaged position. When the plug 181 is fully inserted into the plug receptacle 117, a catch 305 formed as part of the plug 181 aligns with the latch 207 and permits the latch 207 to return to the engaged position. Engagement of the latch 207 with the catch 305 prevents the plug 181 from being removed from the plug receptacle 117.

The latch 207 may be formed as an elongated body made from a magnetic material, e.g., iron, nickel, or nickel-plated steel. Thus, the latch 207 may be moved within the latch channel 301 by placing an appropriate magnetic field near the first housing 111. By placing such an appropriate magnetic field near the first housing 111 when the plug 181 is inserted within the plug receptacle 117 and engaged by the latch 207, the latch 207 may be moved from the engaged position to the disengaged position, thereby allowing the plug 181 to be removed from the plug receptacle 117.

Figure 5:
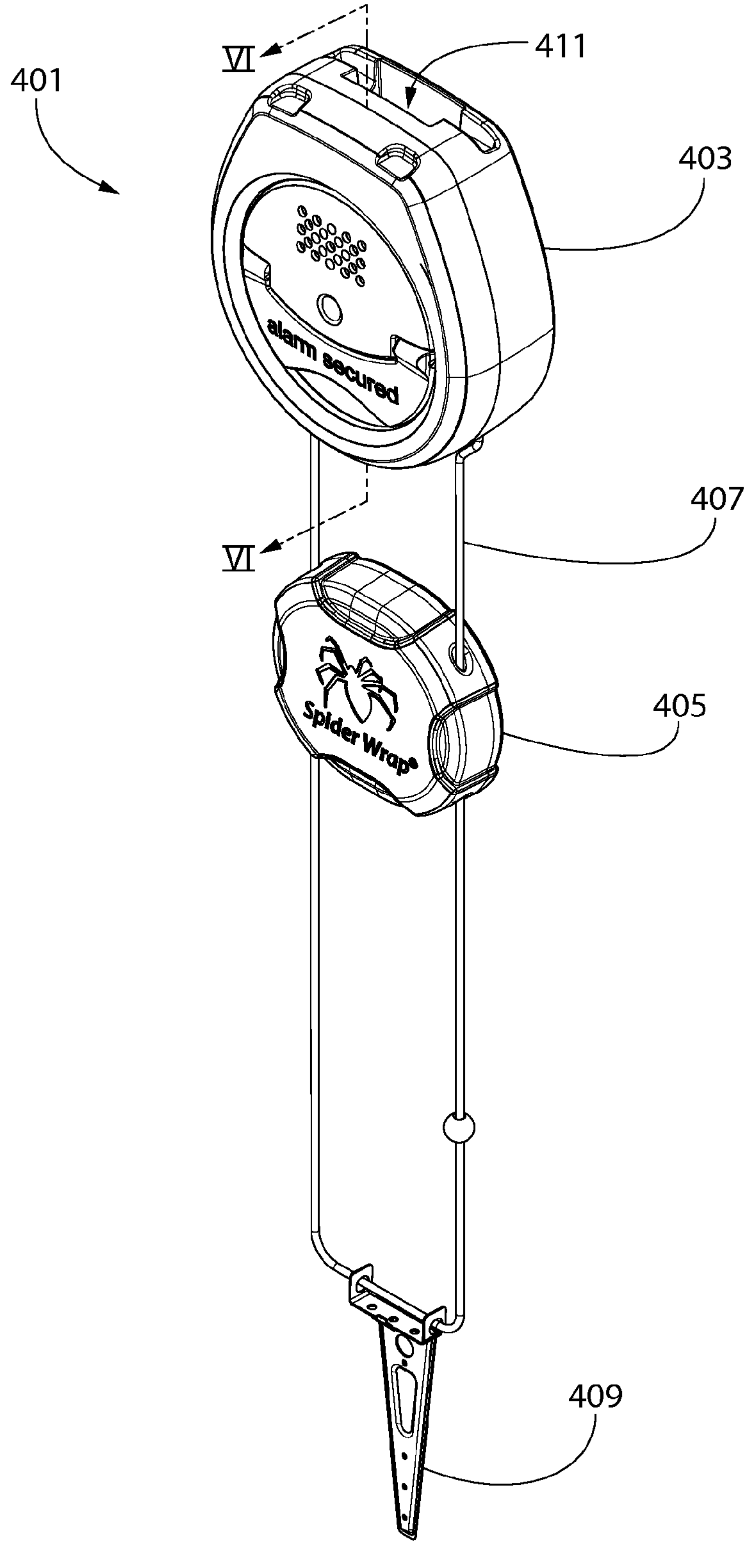
FIG. 5 is a perspective view of a second embodiment of a security device.

A second embodiment of a security device 401 is shown in FIG. 5. This security device 401 includes a first housing 403 and a second housing 405, a cable 407, and a plug 409. The plug 409 is configured to be inserted into the plug receptacle 411 formed in the first housing so that the security device 401 may be attached to an object Like the security device 101 of FIG. 1, the security device 401 shown in FIG. 5 includes mechanisms and security features which aid in preventing the security device 401 from being removed from an object once attached to the object. As one security feature of the security device 401, the second housing 405 may include an EAS tag (not shown). More specifically, an EAS tag may be enclosed within an interior space formed within second housing 405. The EAS tag may be sealed within the second housing 405 to make the EAS tag inaccessible to consumers and would-be thieves. In certain embodiments, the EAS tag may be omitted from the security device 401, or alternatively, the EAS tag may be incorporated into the first housing 403.

Figure 6A:
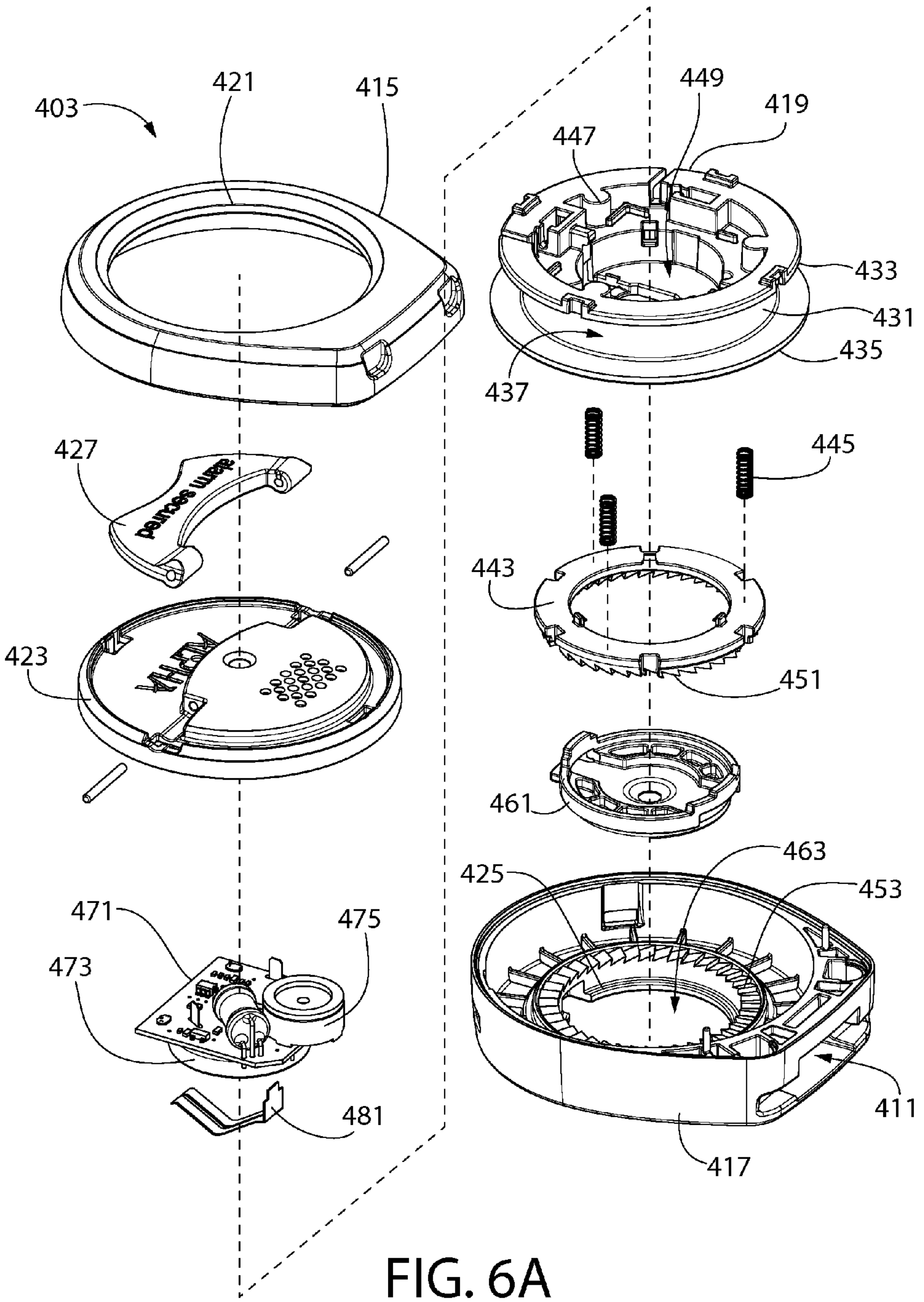
FIG. 6A is an exploded view of the security device of FIG. 5.
Figure 6B:
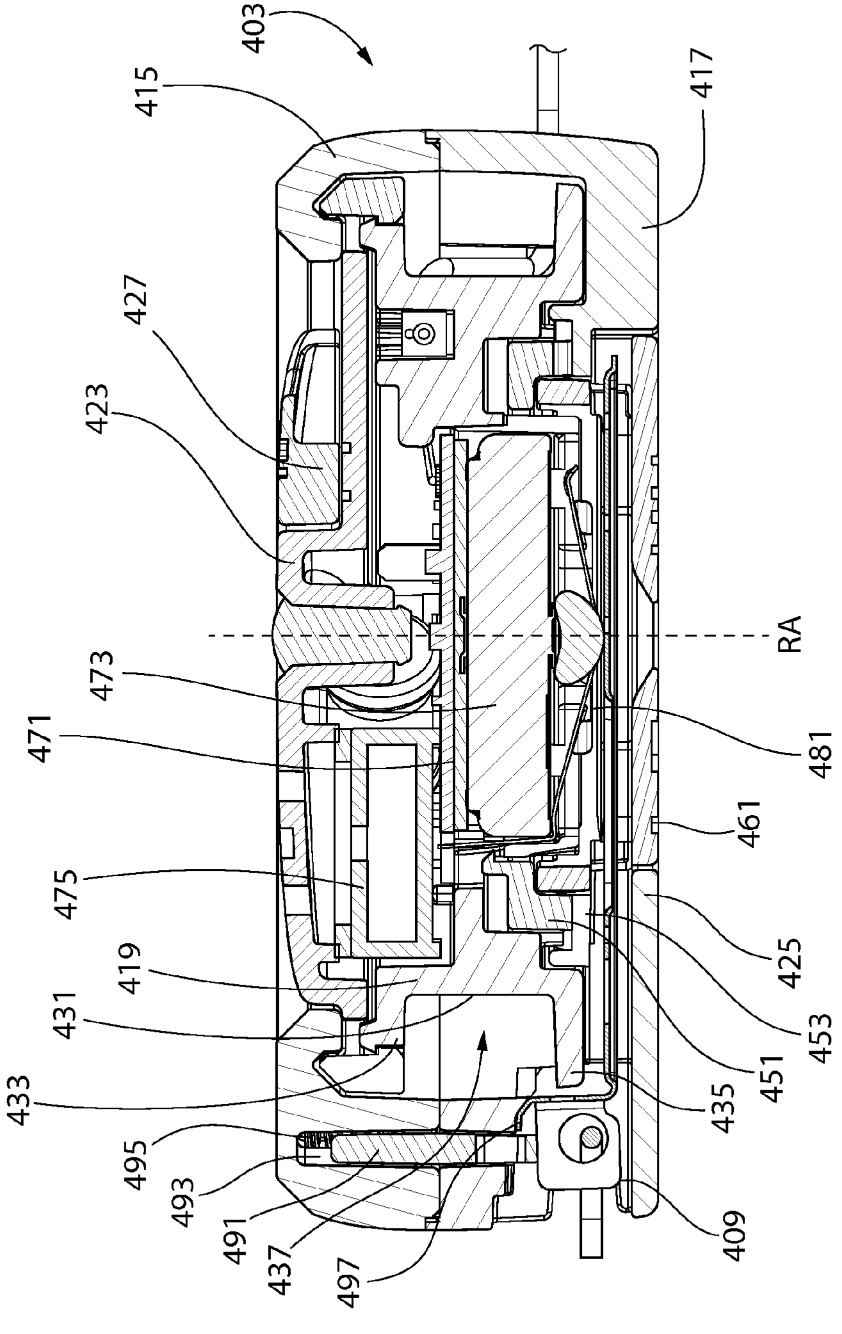
FIG. 6B is a sectional view of the first housing taken along the lines VI-VI of FIG. 5, shown with the plug in the inserted position.
Figure 6C:
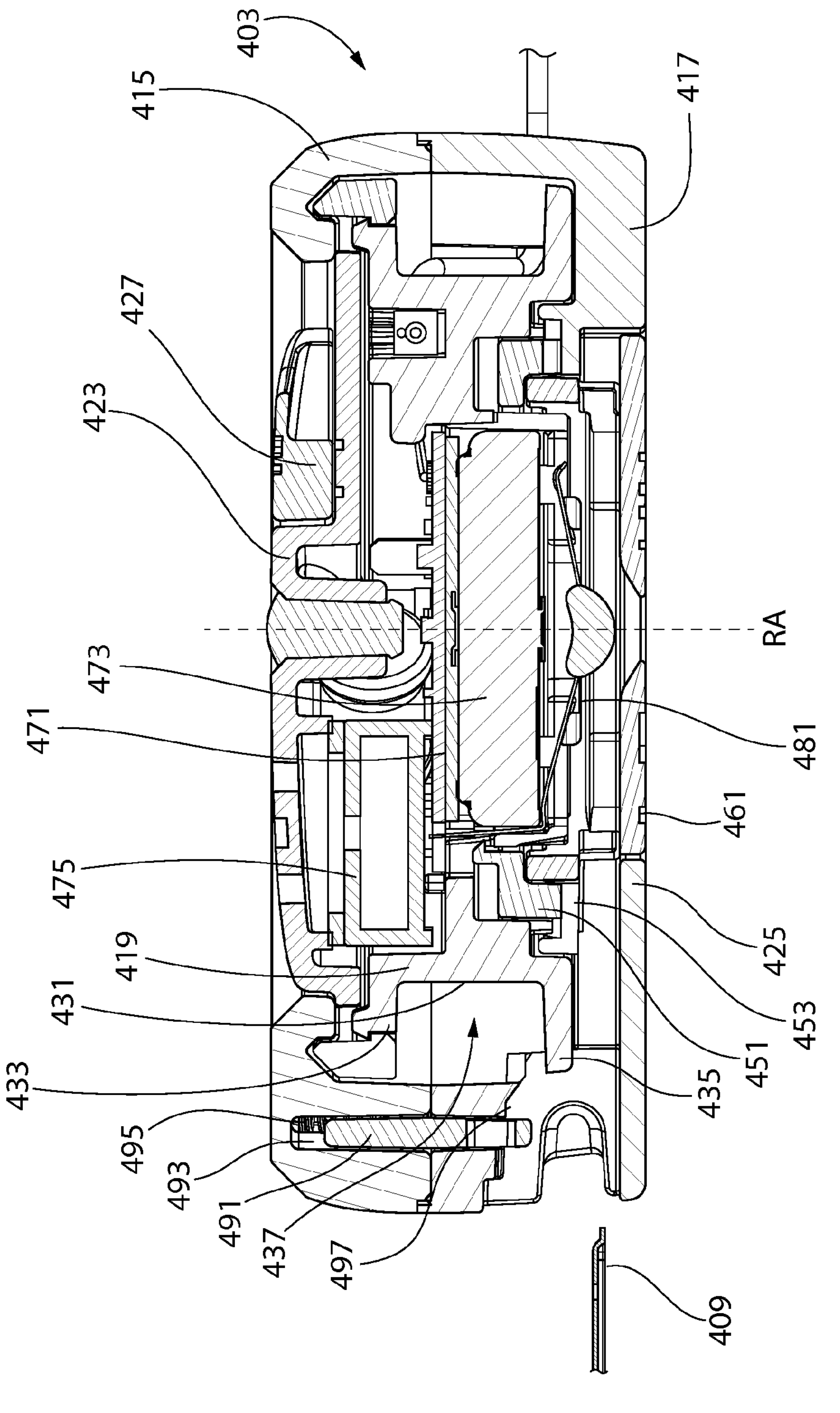
FIG. 6C is a sectional view of the first housing taken along the lines VI-VI of FIG. 5, shown with the plug in the removed position.

Referring collectively to FIGS. 6A-C, the first housing 403 The first housing 403 is formed from a first housing part 415 connected to a second housing part 417. The two housing parts 415, 417 form an interior space to hold the spool 419 in place so that the spool 419 can rotate. The first housing part 415 includes an annular rim 421, and a cap 423 is seated within the interior space formed by the two housing parts 415, 417 and against the rim 421. The cap 423 is coupled to and rotates with the spool 419. The second housing part 417 includes an inward extending ledge 425, and the combination of the spool 419 and the cap 423 are captive between the rim 421 and the ledge 425.

A handle 427 is pivotably coupled to the cap 423 and is accessible through the central opening of the annular rim 421 in the first housing part 415. The handle 427 may be placed in a folded position, so that it is substantially flush with the top of the first housing part 415, or it may be placed in a flipped-up position, so that it may be used to rotate the spool 419.

Within the interior space formed by the two housing parts 215, 217, the spool 419 is rotatable with respect to the first housing 403 in both a first direction and a second direction (i.e., clockwise and counter-clockwise) about a rotational axis RA. The spool 419 is captive within a cavity formed by the outer walls of the first housing 403. The spool 419 has a cylindrical side wall 431 and two cylindrical flanges 433, 435 extending outwardly from the top and bottom of the side wall 431. The side wall 431 and flanges 433, 435 form a cylindrical channel 437 in which a portion of the cable may be stored or held. One end of the cable is secured to the spool 419, and the other end of the cable is secured to the first housing 403. Rotation of the spool 419 in the second direction winds the cable around the spool 419 and rotation of the spool 419 in the first direction allows the cable to be unwound from the spool 419.

A locking ring 443 is coupled to one side of the spool 419 so that the locking ring 443 rotates with the spool 419. The locking ring 443, like the spool 419, is centered about the rotational axis RA. The locking ring 443 is also able to translate along the rotational axis RA toward and away from the spool 419. Springs 445 are held in receptacles 447 formed in the central portion 449 of the spool 419, the central portion 449 being bounded by the cylindrical side wall 431, and the springs 445 bias the locking ring 443 in a position away from the spool 419, with the extent of the translational movement being limited by the first housing 403. The surface of the locking ring 443 facing away from the spool 419 includes locking teeth 451. The surface in the first housing 403 which faces the locking teeth 451 of the locking ring 443 likewise includes complementary locking teeth 453. In combination, the locking teeth 451 of the locking ring 443 and the locking teeth 453 of the first housing 403 form a locking mechanism for the security device 401. When the locking ring 443 is in a position biased away from the spool 419, the locking teeth 451 of the locking ring 443 engage the locking teeth 453 of the first housing 403, and the respective geometries of the interlocking teeth 451, 453 enables the spool 419 to rotate with a ratcheting action. Engagement between the respective locking teeth 451, 453, referred to herein as the locked state of the locking mechanism, prevents the spool 419 from rotating in the first direction, while still allowing the spool 419 to rotate in the second direction. When the respective locking teeth 451, 453 are not engaged, referred to herein as the unlocked state of the locking mechanism, the spool 419 may be freely rotated in both directions.

A button 461 is coupled to the first housing 403 and is movable in a direction parallel to the rotational axis RA. Movement of the button 461 in the direction toward the spool 419 causes the locking ring 443 to move toward the spool 419, thus placing the locking mechanism in the unlocked state. Movement of the button 461 in the direction away from the spool 419 allows the locking ring 443 to move toward its biased position away from the spool 419, thus placing the locking mechanism in the locked state. The first housing 403 includes an opening 463 in the annular rim 421 which gives a user access to the button 461.

The alarm circuit includes a circuit board 471 which is mounted on the side of the spool 419 opposite the locking ring 443, and the circuit board 471 rotates with and is in a fixed position with respect to the spool 419. The circuit board 471 is electrically coupled to a battery 473 and to a piezo-electric device 475, which is used by the alarm circuit to sound an audible alarm. The battery 473 is positioned within the central portion 449 of the spool 419, and the battery 473 also rotates with the spool 419. As indicated above, the alarm circuit includes at least two sensing circuits, the first for sensing continuity of the cable, and the second for sensing the plug 409 being moved from the inserted position to the removed position. The alarm circuit includes, as part of the second sensing circuit, a resilient contact member 481, which extends from the circuit board 471 to a position on the opposite side of the battery 473 from the circuit board 471. The resilient contact member 481 includes two states. In the first state, the resilient contact member 481 is not in contact with the battery 473, thus leaving the second sensing circuit is open. In the second state, the resilient contact member 481 is in contact with the battery 473, so that the second sensing circuit is closed. When the plug 409 is in the removed position, the resilient contact member 481 resiliently returns to its first state by extending into the space that would be otherwise occupied by the plug 409 within the first housing 403. When the plug 409 is in the inserted position, the plug 409 engages the resilient contact member 481 to place the resilient contact member 481 into the second state. Thus, the second sensing circuit is closed by the plug 409 being in the inserted position, and open when the plug 409 is in the removed position.

The plug receptacle 411 is formed so that the plug 409 may be inserted into the housing and into a position between the button 461, on the one hand, and the spool 419 and the resilient contact member 481, on the other hand. In addition to engaging the resilient contact member 481 when in the inserted position, the plug 409 in the inserted position prevents the button 461 from being moved in the direction toward the spool 419, so that the locking ring 443 will be in its biased position away from the spool 419, thus placing the locking mechanism in the locked state. When the plug 409 is in the removed position, the button 461 may be used to move the locking ring 443 and place the locking mechanism in the unlocked state.

As indicated above, the latch 491 interacts with and engages the plug 409 when the plug 409 is inserted into the plug receptacle 411. The first housing 403 includes a latch channel 493 in which the latch 491 and a coil spring 495 are disposed. The latch channel 493 is fully internal to the first housing 403. Within the latch channel 493, the latch 491 is moveable between the engaged position, in which the latch 491 extends into plug receptacle 411, and the disengaged position, in which the latch 491 is withdrawn from the plug receptacle 411. The coil spring 495 is positioned between the latch 491 and an end of the latch channel 493 to bias the latch 491 toward the engaged position. As the plug 409 is inserted into the plug receptacle 411, the plug 409 engages the latch 491 to first push the latch 491 toward the disengaged position. When the plug 409 is fully inserted into the plug receptacle 411, a catch 497 formed as part of the plug 409 aligns with the latch 491 and permits the latch 491 to return to the engaged position. Engagement of the latch 491 with the catch 497 prevents the plug 409 from being removed from the plug receptacle 411.

The latch 491 may be formed as an elongated body made from a magnetic material, e.g., iron, nickel, or nickel-plated steel. Thus, the latch 491 may be moved within the latch channel 493 by placing an appropriate magnetic field near the first housing 403. By placing such an appropriate magnetic field near the first housing 403 when the plug 409 is inserted within the plug receptacle 411 and engaged by the latch 491, the latch 491 may be moved from the engaged position to the disengaged position, thereby allowing the plug 409 to be removed from the plug receptacle 411.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A security device comprising:

a housing having a plug receptacle;

a spool rotatably coupled to the housing and rotatable in both a first direction and a second direction with respect to the housing;

a locking mechanism alterable between a locked state and an unlocked state, wherein the locking mechanism in the locked state prevents the spool from rotating in the first direction, and the locking mechanism in the unlocked state permits the spool to rotate in the first direction and in the second direction;

a plug having an inserted position and a removed position with respect to the plug receptacle, wherein in the inserted position, the plug maintains the locking mechanism in the locked state so that the spool is rotatable in the second direction with respect to the plug, and in the removed position, the locking mechanism is alterable from the locked state to the unlocked state;

a cable having a first end coupled to the spool and a second end coupled to the plug; and an alarm circuit configured to activate an alarm upon sensing at least one of discontinuity of the cable and movement of the plug from the inserted position to the removed position;

wherein the alarm circuit comprises a resilient contact member movable between a first state and a second state, and the alarm circuit senses movement of the plug from the inserted position to the removed position by movement of the contact member from the second state to the first state;

wherein the alarm circuit comprises a piezo- electric device configured to produce the alarm, the piezo-electric device rotating with the spool and being positioned between the contact member and the plug when the plug is in the inserted position; and wherein the piezo-electric device is translatable along a rotational axis of the spool between a first position in which the contact member is in the first state and a second position in which the piezo-electric device places the contact member into the second state.

2. The security device of claim 1, wherein the alarm circuit comprises a wireless receiver configured to receive an alarm disable signal, and the alarm circuit is configured to activate the alarm upon sensing movement of the plug from the inserted position to the removed position without first receiving the alarm disable signal.

3. The security device of claim 1, wherein the alarm circuit comprises a sensing circuit, and the contact member is conductive, such that in the second state the contact member closes the sensing circuit.

4. The security device of claim 1, wherein the plug in the inserted position engages the contact member and places the contact member in the second state.

5. The security device of claim 1, wherein the piezo-electric device is spring biased toward the first position.

6. The security device of claim 1, wherein the plug in the inserted position engages the piezo-electric device to place the piezo-electric device in the second position.

7. The security device of claim 1, further comprising a latch coupled to the housing and biased toward an engaged position in which the latch engages the plug to maintain the plug in the inserted position, wherein the latch is moveable to a disengaged position in which the latch disengages the plug.

8. A security device comprising:

a housing having a plug receptacle;

a plug having an inserted position and a removed position with respect to the plug receptacle;

a spool rotatably coupled to the housing and rotatable in both a first direction and a second direction with respect to both the housing and the plug;

a cable having a first end coupled to the spool and a second end coupled to the plug;

a locking ring coupled to the spool to rotate with respect to the housing and with respect to the plug, the locking ring being moveable between a locked position and an unlocked position, wherein the locking ring in the locked position engages the housing to prevent the spool from rotating in the first direction, and with the locking ring in the unlocked position, the spool is rotatable in the first direction and in the second direction; and an alarm circuit coupled to the spool to rotate with respect to the housing and with respect to the plug when the plug is in the inserted position, the alarm circuit including a resilient contact member, which is alterable between a first state with the plug in the removed position and a second state with the plug in the inserted position, and a wireless receiver, which is configured to receive an alarm disable signal, wherein the alarm circuit is configured to activate an alarm upon sensing movement of the plug from the inserted position to the removed position without first receiving the alarm disable signal;

wherein the alarm circuit comprises a piezo- electric device configured to produce the alarm, the piezo-electric device rotating with the spool and being positioned between the contact member and the plug when the plug is in the inserted position;

wherein the piezo-electric device is translatable along a rotational axis of the spool between a first position in which the contact member is in the first state and a second position in which the piezo-electric device places the contact member into the second state.

9. The security device of claim 8, wherein the alarm circuit senses movement of the plug from the inserted position to the removed position by sensing movement of the contact member from the second state to the first state.

10. The security device of claim 8, wherein the alarm circuit comprises a sensing circuit, and the contact member is conductive, such that in the second state the contact member closes the sensing circuit.

11. The security device of claim 8, wherein the plug in the inserted position engages the contact member and places the contact member in the second state.

12. The security device of claim 8, wherein the piezo-electric device is spring biased toward the first position.

13. The security device of claim 8, wherein the plug in the inserted position engages the piezo-electric device to place the piezo-electric device in the second position.

14. The security device of claim 8, further comprising a latch coupled to the housing and biased toward an engaged position in which the latch engages the plug to maintain the plug in the inserted position, wherein the latch is moveable to a disengaged position in which the latch disengages the plug.

15. A security device comprising:

a housing having a plug receptacle;

a spool rotatably coupled to the housing and rotatable in both a first direction and a second direction with respect to the housing;

a locking mechanism coupled to the housing and alterable between a locked state and an unlocked state, wherein the locking mechanism in the locked state prevents the spool from rotating in the first direction, and with the locking mechanism in the unlocked state, the spool is rotatable in the first direction and in the second direction;

a plug having an inserted position and a removed position with respect to the plug receptacle, wherein in the inserted position, the plug maintains the locking mechanism in the locked state so that the spool is rotatable in the second direction with respect to the plug, and in the removed position, the locking mechanism is alterable from the locked state to the unlocked state;

a cable having a first end coupled to the spool and a second end coupled to the plug; and an alarm circuit coupled to the spool to rotate with respect to the housing and with respect to the plug when the plug is in the inserted position, the alarm circuit comprising:

a first sensing circuit configured to sense discontinuity of the cable;

a second sensing circuit having a resilient contact member movable between a first state in which the second sensing circuit is open and a second state in which the second sensing circuit is closed, wherein the contact member is in the second state when the plug is in the inserted position, and the contact member moves to the first state when the plug is moved from the inserted position to the removed position, wherein the alarm circuit is configured to activate an alarm upon sensing at least one of discontinuity of the cable and movement of the contact member from the first state to the second state.

* * * * *